US008950053B2

(12) United States Patent
Olson et al.

(10) Patent No.: US 8,950,053 B2
(45) Date of Patent: Feb. 10, 2015

(54) GROMMET SLOT

(75) Inventors: Brad Olson, Plainwell, MI (US); Drew Deters, Portage, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 679 days.

(21) Appl. No.: 11/925,798

(22) Filed: Oct. 27, 2007

(65) Prior Publication Data

US 2009/0106967 A1 Apr. 30, 2009

(51) Int. Cl.
*B21D 39/00* (2006.01)
*B23P 11/00* (2006.01)
*B25B 27/00* (2006.01)

(52) U.S. Cl.
CPC .................................. *B25B 27/0028* (2013.01)
USPC ............................................ 29/505; 248/634

(58) Field of Classification Search
USPC ............ 29/525.05, 897, 897.2, 505; 248/560, 248/562, 615, 634, 638; 16/2.1
See application file for complete search history.

(56) References Cited

U.S. PATENT DOCUMENTS

| | | | | | |
|---|---|---|---|---|---|
| 3,210,816 | A | * | 10/1965 | Clemons | 128/852 |
| 4,976,410 | A | * | 12/1990 | Tomaiuolo | 248/514 |
| 5,507,610 | A | * | 4/1996 | Benedetti et al. | 411/339 |
| 6,479,748 | B2 | * | 11/2002 | Mori | 174/651 |
| 6,594,870 | B1 | * | 7/2003 | Lambrecht et al. | 24/297 |
| 7,168,879 | B2 | | 1/2007 | Bertram et al. | |
| 7,178,855 | B2 | * | 2/2007 | Catron et al. | 296/146.7 |
| 7,244,894 | B1 | * | 7/2007 | Lipp | 174/650 |
| 2002/0101713 | A1 | * | 8/2002 | Eland | 361/686 |
| 2003/0095377 | A1 | * | 5/2003 | Goodman et al. | 361/685 |
| 2007/0107174 | A1 | * | 5/2007 | Bordas | 24/664 |
| 2007/0181332 | A1 | * | 8/2007 | Fraley et al. | 174/72 A |

* cited by examiner

*Primary Examiner* — David Bryant
*Assistant Examiner* — Christopher M Koehler
(74) *Attorney, Agent, or Firm* — James Hasselbeck

(57) ABSTRACT

In a method for inserting a grommet into a structural member, a grommet slot is provided that opens into a grommet hole. The grommet slot is accessible in a plane of the grommet hole at an access location spaced from the grommet hole and has a closed-off end remote from the grommet hole. The grommet is compressed to a size allowing insertion into the grommet slot at the access location. The grommet is inserted into the grommet slot at the access location and pushed into the grommet hole. The method can be done manually or by automation.

5 Claims, 3 Drawing Sheets

GROMMET SLOT

BACKGROUND OF THE INVENTION

The invention relates to a method for installing a coupling part such as a rubber grommet without chamfered lead-in in a grommet hole provided in structural members, usually made of plastic, employed primarily in the automobile industry, e.g, airfilter housings, resonators, containers for brake fluid or water, oil separators, pressure regulators, covers, or vacuum tanks.

Typically, grommets are inserted into the grommet hole in the direction of a center axis of the grommet hole. This requires a significant force expenditure and causes the grommet to undergo significant deformation possibly causing the grommet to become damaged.

Another way of installing a grommet is to provide a grommet slot that opens into the grommet hole and extends radially away from the grommet hole (see FIG. 1). The grommet slot opens at an edge of the structural member provided with the grommet hole so that the grommet can be pushed from the edge of the structural member through the radial grommet slot into the grommet hole. Such a grommet slot extending to the edge of a structural member has the disadvantage that the slotted structural member is prone to bend or warp so that insertion of the grommet is difficult. Moreover, the flexibility imparted to the structural member by the grommet slot negatively affects the alignment of the grommet and retention of the grommet as the dimensional stability of the structural member is impaired by the grommet slot.

U.S. Pat. No. 7,168,879 employs a similar principle. Disclosed is a plug-in coupling comprising a socket integral with a first structural member and provided with a laterally open cylindrical peripheral wall. The peripheral wall has an inwardly projecting collar with slot-shaped opening through which a female coupling part can be laterally inserted into the socket when manually compressed. A male coupling part of a second structural member is then inserted axially into the female coupling part for fastening the second structural member on the first structural member. The arrangement allows detachment of the male coupling part from the female coupling part and thus detachment of the structural parts if needed.

SUMMARY OF THE INVENTION

It is an object of the present invention to provide a method for installing a coupling part such as a rubber grommet in a grommet hole which method facilitates insertion without compromising the structural integrity of the structural member and which method enables automation.

In accordance with the present invention, this is achieved in that a grommet slot is provided that opens into a grommet hole, wherein the grommet slot is accessible in a plane of the grommet hole at an access location spaced from the grommet hole and has a closed-off grommet slot end that is remote from the grommet hole. The grommet is compressed to a size allowing insertion into the grommet slot at the access location and the grommet is inserted into the grommet slot at the access location and pushed into the grommet hole.

As is known in the art, metal sleeves or bolts etc. are then inserted into the grommet for mounting the structural member in the automobile.

Accordingly, a grommet slot is provided that has a closed-off grommet slot end and is thus closed peripherally but enables insertion of the grommet in a direction of the plane of the grommet hole or transverse to a center axis of the grommet hole.

The grommet slot according to the present invention does not impair the dimensional stability of the structural member as it has a closed-off grommet slot end and enables therefore automated insertion of the grommet. The grommet slot is arranged such that it does not open at the free edge of the structural member but instead extends within the structural member and has a closed-off grommet slot end opposite the grommet hole. The dimensional stability of the structural member is not compromised as the end of the grommet slot is "bridged". Moreover, the arrangement of the grommet slot within the structural member allows for providing reinforcement elements or support ribbing in order to increase strength and ensure proper function of an automated grommet insertion process.

DESCRIPTION OF THE PREFERRED EMBODIMENTS

Figure 1:
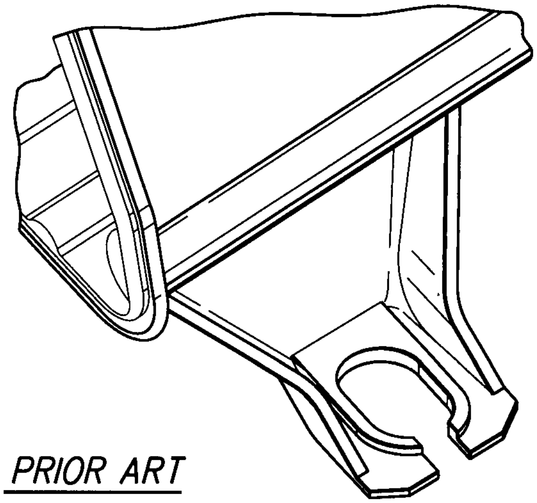
Fig. 1 PRIOR ART
FIG. 1 shows in accordance with the prior art an opening in a bracket into which a grommet is to be inserted through the open ended grommet slot.

FIG. 1 illustrates the prior art principle of installing a grommet by having an open ended grommet slot. It is apparent that the open configuration of the grommet slot reduces the stability and stiffness of the bracket and the lateral parts defining the slot can bend or warp.

Figure 2:
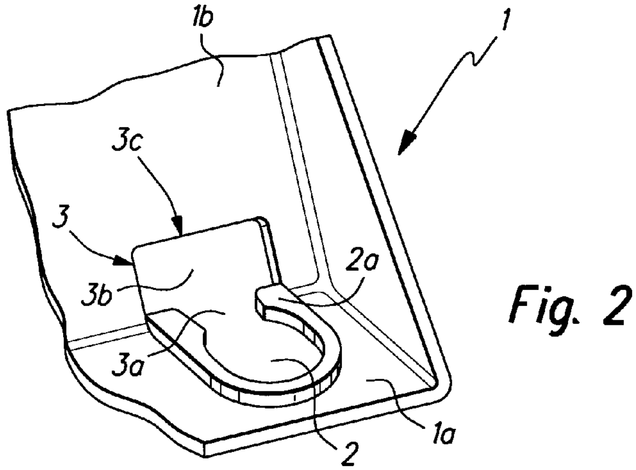
FIG. 2 is a front view of a bracket having a grommet hole into which a grommet is to be inserted and illustrating an embodiment of a grommet slot according to the present invention.
Figure 3:
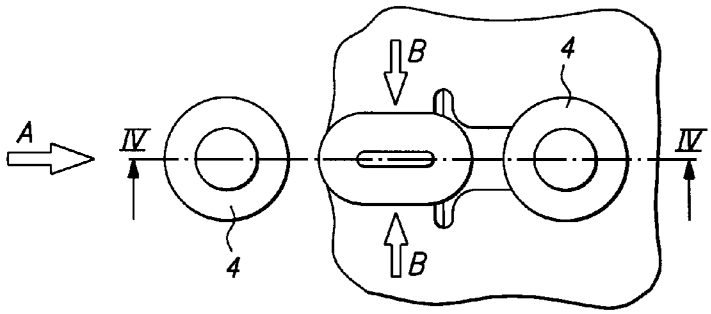
FIG. 3 is a rear view of the bracket of FIG. 2 illustrating the basic steps of installing the grommet in the grommet hole of the bracket of FIG. 2.
Figure 4:
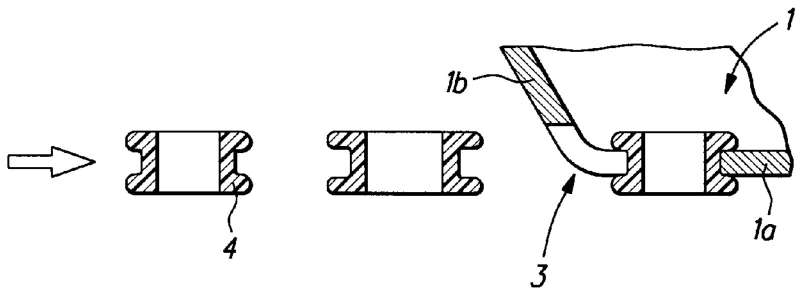
FIG. 4 shows a cross-section of the bracket and grommet as indicated in FIG. 3.
Figure 5:
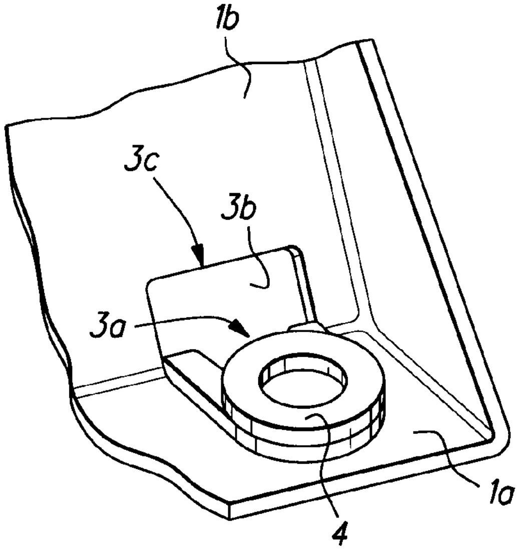
FIG. 5 shows the grommet installed in the grommet hole of the bracket of FIG. 2.
Figure 6:
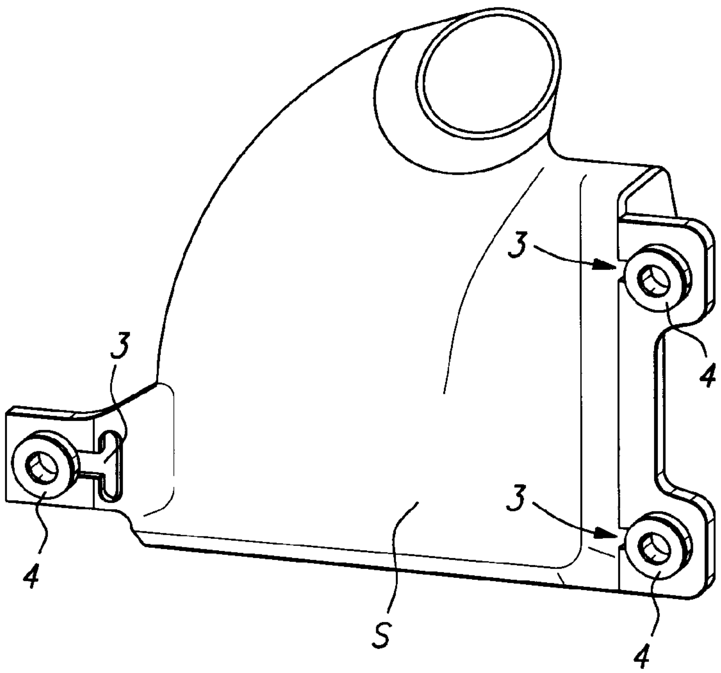
FIG. 6 shows a structural member provided with brackets having grommet slots according to the invention in which grommets are installed.

The principle of the present invention will be explained with the aid of the FIGS. 2 through 6. FIGS. 2 and 3 show an angle bracket 1 in a front view (FIG. 2) and a rear view (FIG. 3). Such angle brackets are provided usually as an integral part of a structural member S as shown in FIG. 6. The angle bracket 1 is comprised of a first bracket part 1*a* provided with an opening or grommet hole 2 with axially projecting collar 2*a*. As shown in FIG. 2, the first bracket part (1*a*) and the second bracket part (1*b*) are unitary one-piece with the angle bracket (1). The angle bracket 1 has a second bracket part 1*b* angled away from the bracket part 1*a*. A grommet slot 3 shaped in accordance with the present invention opens into the opening or grommet hole 2. The grommet slot 3 has a narrow section 3*a* extending in the plane of the grommet hole 2 in the bracket part 1*a* and a wide section 3*b* extending in the bracket part 1*b* so that the grommet slot 3 has an angled configuration in this embodiment. In contrast to the grommet slot arrangement of the prior art, the grommet slot 3 according to the invention does not extend to the free edge of the bracket but extends within the bracket part 1*b* that is attached to the structural member S so that the grommet slot 3 has no open end and the grommet slot 3 has a peripherally closed structure. The grommet slot end 3*c* opposite the grommet hole 2 is closed so that the lateral parts defining the grommet slot cannot warp or bend. Also, the arrangement of the grommet slot 3 in the bracket part 1*b* connected to the structural member S provides additional strength and stiffness.

A grommet 4 (FIG. 3) is to be installed in the grommet hole 2 by inserting the grommet 4 in the direction illustrated by arrow A at the access location of the grommet slot 3 where the narrow grommet slot section 3*a* and the wide grommet slot section 3*b* meet.

The insertion of the grommet 4 is done by compressing (see arrows B in FIG. 3) the round grommet 4 to assume an elongate shape as shown in FIG. 3 matching essentially the width of the narrow grommet slot section 3*a* and then pushing the compressed grommet 4 in the direction of arrow A through the grommet slot section 3*a* into the grommet hole 2 where the grommet 4 snaps into place.

The wide grommet slot section 3*b* is angled relative to the slot section 3*a* and extends past collar 2*a* so as to accommodate the height H of the grommet 4 and enables insertion of the grommet 4 into the grommet slot 3 and pushing of the compressed grommet 4 through the narrow grommet slot section 3*a* into the grommet hole 2.

Mounting of the grommet 4 can be done manually. However, the inventive grommet slot design enables automation as the grommet slot arrangement does not impair the dimensional stability of the angle bracket and the grommet slot provided therein.

The illustrated shape of the grommet slot 3 resembles the letter "T" but this is not to be understood as a limitation as other shapes and configurations will be readily apparent to a person of skill in the art the requirement being that the grommet slot has no open end, extends within the bracket, and has a shape enabling insertion of the grommet into the peripherally closed grommet slot. Also, the angle defined between the bracket parts 1*a*, 1*b* also affects the shape of the widened grommet slot section: as the angle α increases, the length of the widened grommet slot section 3*b* in the bracket part 1*b* must increase so as to accommodate the height H of the grommet.

The grommet slot configuration according to the invention enables automation and thus a reduction in cycle time, increased accuracy as human error in the mounting process is eliminated, and better grommet retention as the dimensional integrity of the bracket/structural member is improved. Moreover, automation also reduces sick leave as the risk of repetitive motion injuries is eliminated.

The shape of the bracket illustrated in the drawings is not limiting the invention in any way. It is only important that the grommet slot is configured to enable insertion essentially in the direction of the plane of the grommet hole or, in other words, transversely to the center axis of the grommet hole, and that the grommet slot has no open end opposite the grommet hole but instead a closed peripheral structure in order to ensure dimensional stability.

While specific embodiments of the invention have been shown and described in detail to illustrate the inventive principles, it will be understood that the invention may be embodied otherwise without departing from such principles.

What is claimed is:

1. A method for inserting a grommet into a grommet hole, the method comprising the steps of:

providing a structural member (S) including an angle bracket having a first bracket part and a second bracket part, said second bracket part extending at a slant from said first bracket part, said first and second bracket parts are unitary one-piece with said angle bracket;

providing a T-shaped grommet slot that opens into the grommet hole, said grommet slot including:

a first grommet slot section adjoining said grommet hole and extending in a plane of said grommet hole, said first grommet slot section and said grommet hole arranged in said first bracket part;

an axially projecting collar provided on a side of the first bracket part on a circumference said grommet hole, said axially projecting collar extending axially outwardly from said side of said first bracket part;

a second grommet slot section adjoining and extending from said first grommet slot section and extending in a direction traverse to said first grommet section forming said T-shape of said grommet slot, said second grommet slot section configured as a through hole in said second bracket part, one side of said through hole connecting with said first grommet slot section, wherein said second grommet slot section extends at a slant to the plane of said grommet hole and said first grommet slot section;

an access location provided in the plane of said grommet hole and configured to receive said grommet into said grommet slot, said access location provided where said first and second grommet slot sections adjoin;

wherein said second grommet slot section includes a closed-off grommet slot end remote from said access location;

compressing a grommet to a size allowing insertion into the grommet slot at the access location;

inserting the grommet into the grommet slot at the access location and pushing the grommet into the grommet hole.

2. The method according to claim 1, wherein the second grommet slot section is wider than the first grommet slot section.

3. The method according to claim 1, wherein the grommet slot has a first grommet slot section adjoining the grommet hole and a second grommet slot section adjoining the first grommet slot section, wherein the second grommet slot section is wider than the first grommet slot section.

4. The method according to claim 1, wherein the steps of compressing and inserting are automated.

5. A method for inserting a grommet into a grommet hole, the method comprising the steps of:

providing an angle bracket having a first bracket part and a second bracket part, said second bracket part extending at a slant from said first bracket part;

providing a T-shaped grommet slot that opens into the grommet hole, said grommet slot including:

a first grommet slot section adjoining said grommet hole and extending in a plane of said grommet hole, said first grommet slot section and said grommet hole arranged in said first bracket part;

an axially projecting collar provided on a side of the first bracket part on a circumference said grommet hole, said axially projecting collar extending axially outwardly from said side of said first bracket part;

a second grommet slot section adjoining and extending from said first grommet slot section and extending in a direction traverse to said first grommet section forming said T-shape of said grommet slot, said second grommet slot section configured as a through hole in said second bracket part, one side of said through hole connecting with said first grommet slot section, wherein said second grommet slot section extends at a slant to the plane of said grommet hole and said first grommet slot section;

an access location provided in the plane of said grommet hole and configured to receive said grommet into said grommet slot, said access location provided where said first and second grommet slot sections adjoin;

wherein said second grommet slot section includes a closed-off grommet slot end remote from said access location;

compressing a grommet to a size allowing insertion into the grommet slot at the access location;

inserting the grommet into the grommet slot at the access location and pushing the grommet into the grommet hole.

* * * * *